Sept. 27, 1932.  J. ZIMARIK  1,880,063
TWO-HAND CONTROL FOR PRESSES OR THE LIKE
Filed May 22, 1929   5 Sheets-Sheet 2

INVENTOR.
JOHN ZIMARIK.
BY Ely & Barrow
ATTORNEYS

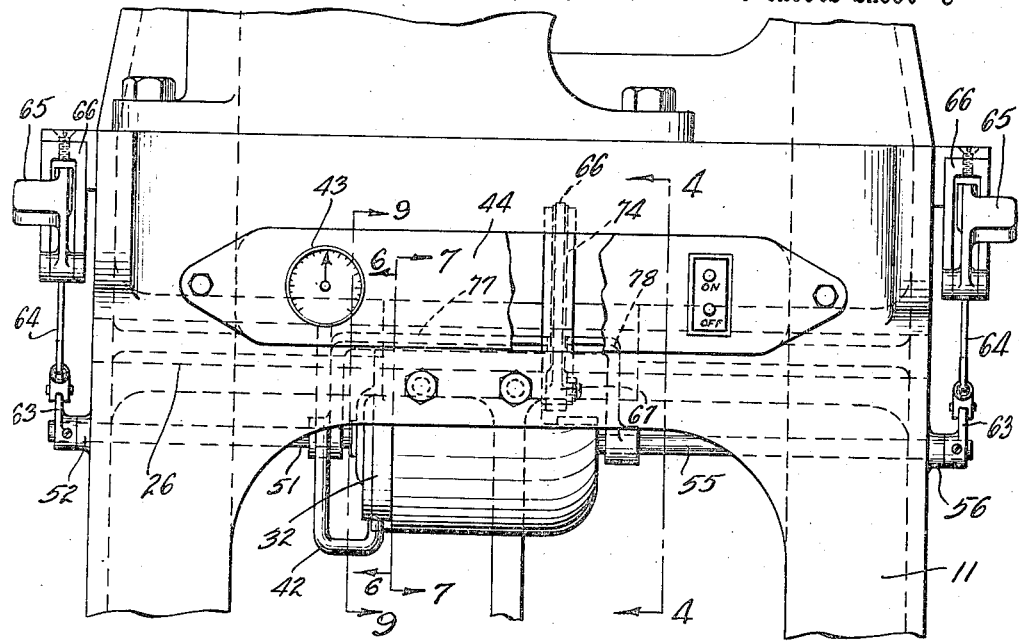
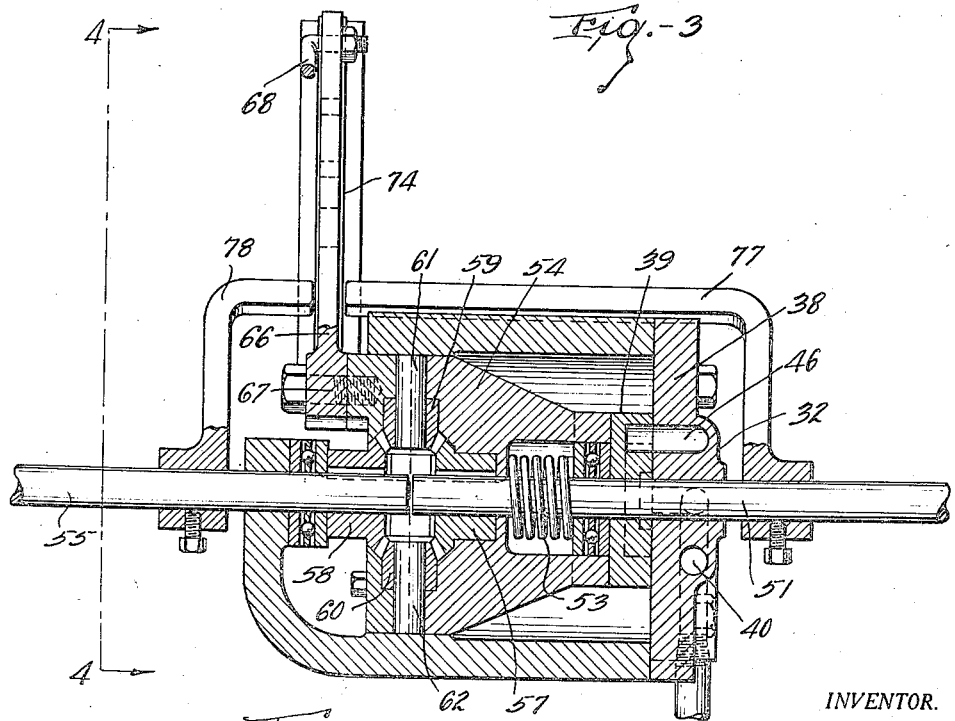

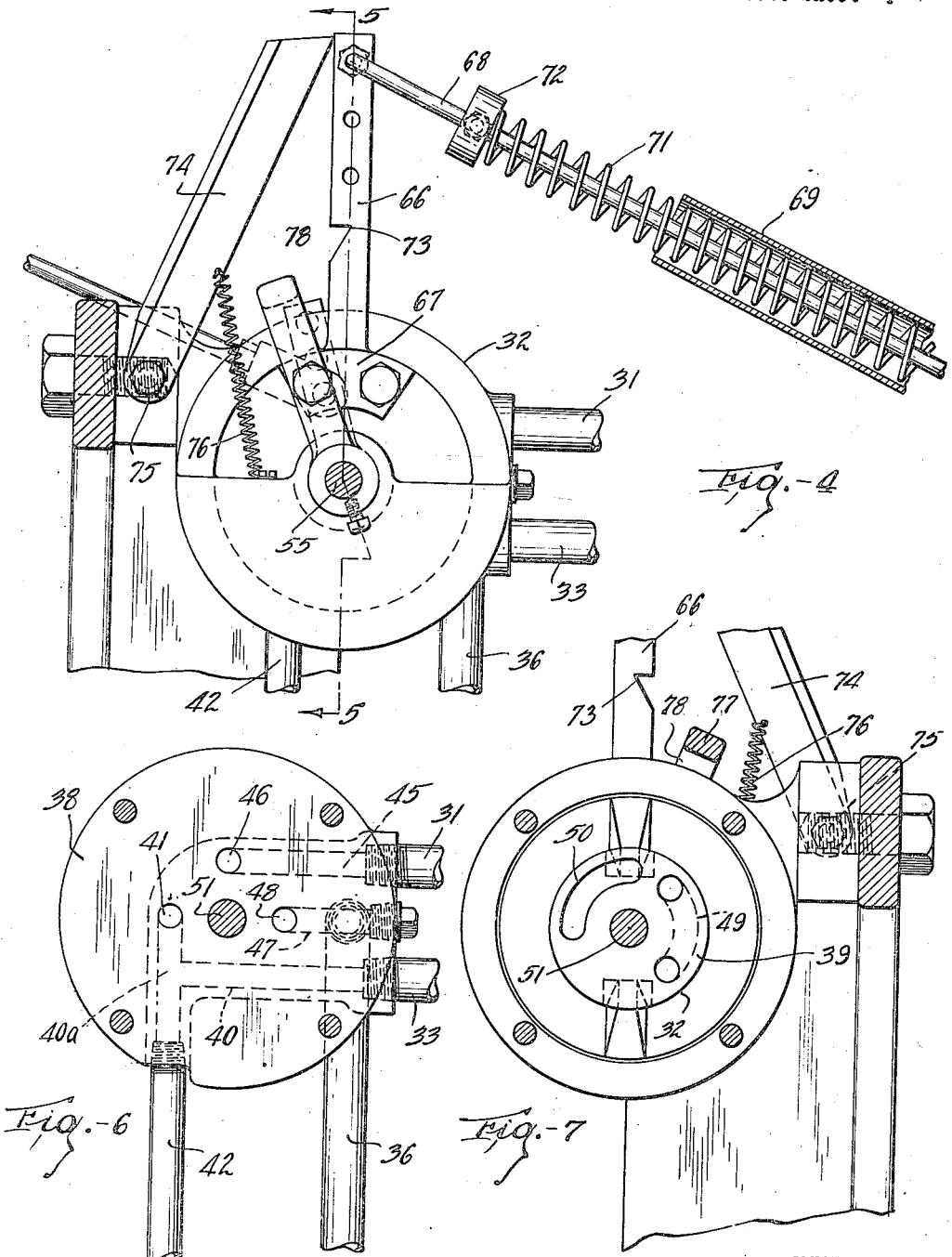

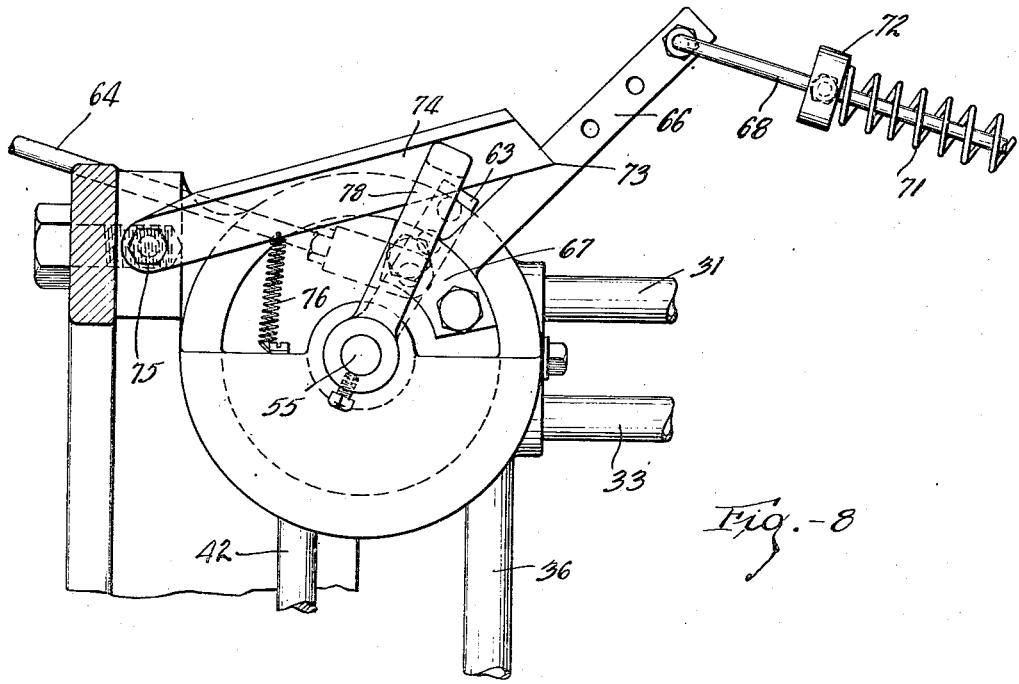
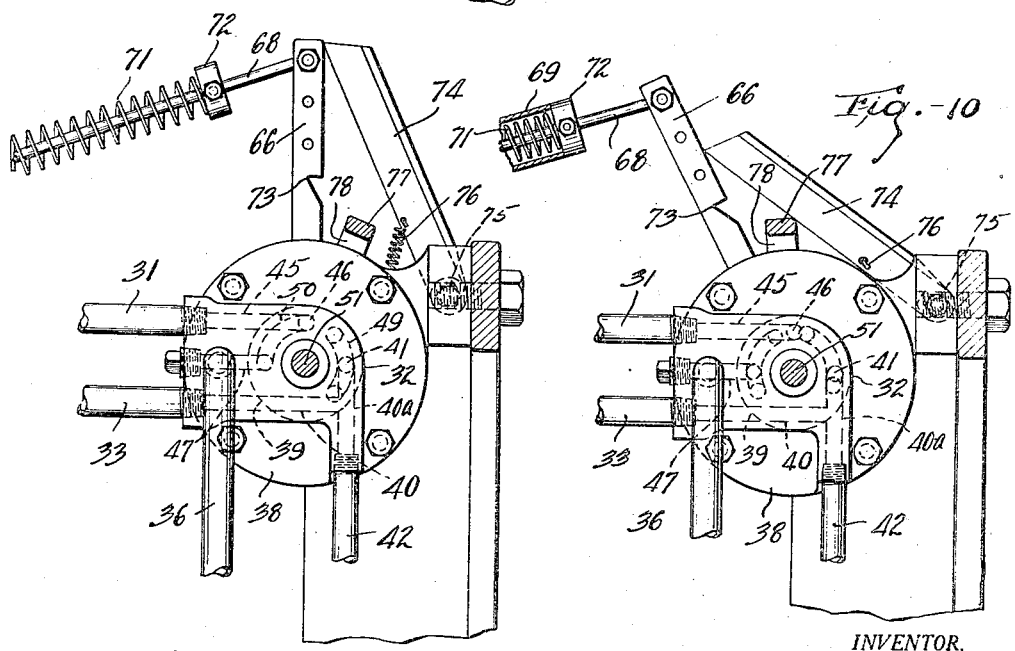

Patented Sept. 27, 1932

1,880,063

UNITED STATES PATENT OFFICE

JOHN ZIMARIK, OF AKRON, OHIO, ASSIGNOR, BY MESNE ASSIGNMENTS, TO THE PROSPERITY COMPANY, INC., OF SYRACUSE, NEW YORK, A CORPORATION OF NEW YORK

TWO-HAND CONTROL FOR PRESSES OR THE LIKE

Application filed May 22, 1929. Serial No. 364,982.

This invention relates to two-hand controls for presses or other apparatus such as tire vulcanizers, etc. where relatively movable parts are brought into cooperation under pressure.

The general purpose of the invention is to provide an improved, greatly simplified two-hand control for press operating motors such as fluid pressure cylinder, electric motors, or the like, in which a single control device is connected to the motor, the two-hand control being provided by mechanical connections permitting operation of said single control device only by two-hand actuation.

A further purpose or object of the invention is to provide means interconnected with the relatively movable press member for locking said motor control device in a position to maintain pressure on the press, said means being held out of locking engagement whereby the press will re-open if a hand is removed from the two-hand control before the press is substantially closed.

The foregoing and other objects of the invention are attained in the two-hand control illustrated, as embodied in a laundry press, in the accompanying drawings and described below. It will be understood that the use of the improved two-hand control is not limited to laundry presses and that the control is not limited to the particular form thereof shown and described.

Of the accompanying drawings,

Figure 3 is a front elevation partly broken away, of a portion of the press illustrating the two-hand control.

Figure 4 is a section on line 4—4 of Figure 3 showing the locking mechanism when the press is open.

Figure 5 is a section on line 5—5 of Figure 4.

Figure 6 is a section on line 6—6 of Figure 3.

Figure 7 is a section on line 7—7 of Figure 3.

Figure 8 is a view similar to Figure 4 showing the locking mechanism in its locked condition.

Figure 9 is a section on line 9—9 of Figure 3, the press being open; and

Figure 10 is a similar view showing the parts as the press is being closed and before it is locked, the parts corresponding to their positions in Figure 1.

Figure 1:
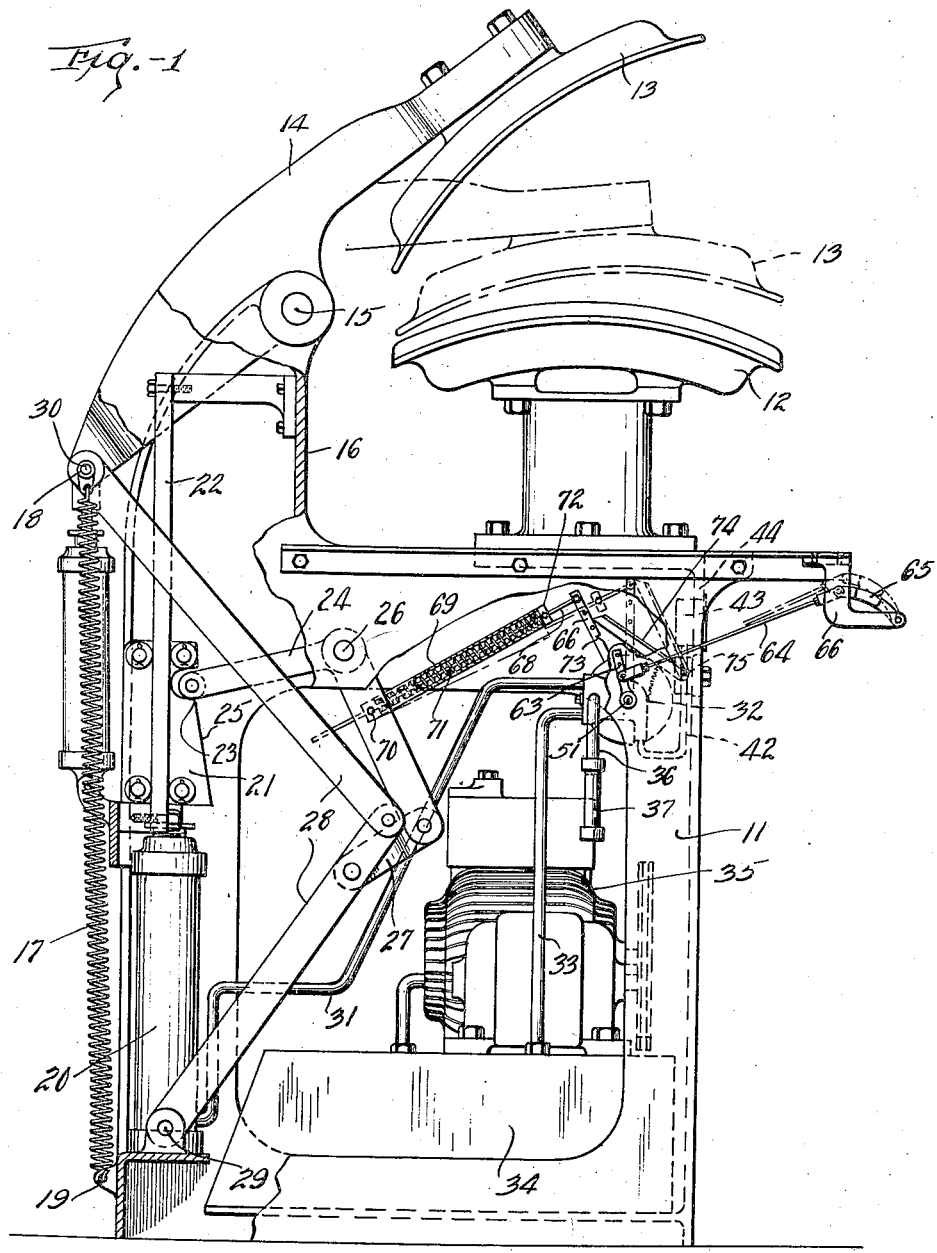
Figure 1 is a side elevation of a laundry press embodying the invention, the press being shown open and the two-hand control as though it had been just operated to cause the press to close, the dotted line position of the head showing the extent of closing movement thereof before the two-hand control is locked to hold the pressure.

Referring to the drawings, the numeral 11 designates a suitable frame on which is mounted a buck 12 with which a head 13 is arranged to cooperate for the pressing of garments. Head 13 is carried on one end of a lever 14 pivoted intermediate its ends at 15 on a standard 16, extending upwardly from frame 11.

To operate the head 13, the rear end lever has springs 17, 17 connected thereto as at 18 and tensioned between the lever and the bottom of frame 11 as at 19 to urge the press head 13 to its open position (Figure 1). The preferred mechanism for closing the press includes a fixed vertical fluid pressure cylinder 20 mounted in the rear of frame 11 and having the piston thereof connected to an actuator 21 cooperating with vertical guides 22 mounted at the rear of frame 11.

The actuator 21 is formed with a shoulder at 23 on which one arm of a bell-crank lever 24 is adapted to rest and below shoulder 23 the actuator is provided with a wedge surface 25 for engagement with said arm of the actuator. The bell-crank 24 is pivoted on frame 11 at 26 and the other arm thereof is connected as by a link 27 to a toggle mechanism 28, one end of which is pivoted at 29 at the bottom of frame 11 and the other end of which is hingedly connected at 30 to the rear end of lever 14.

Figure 2:
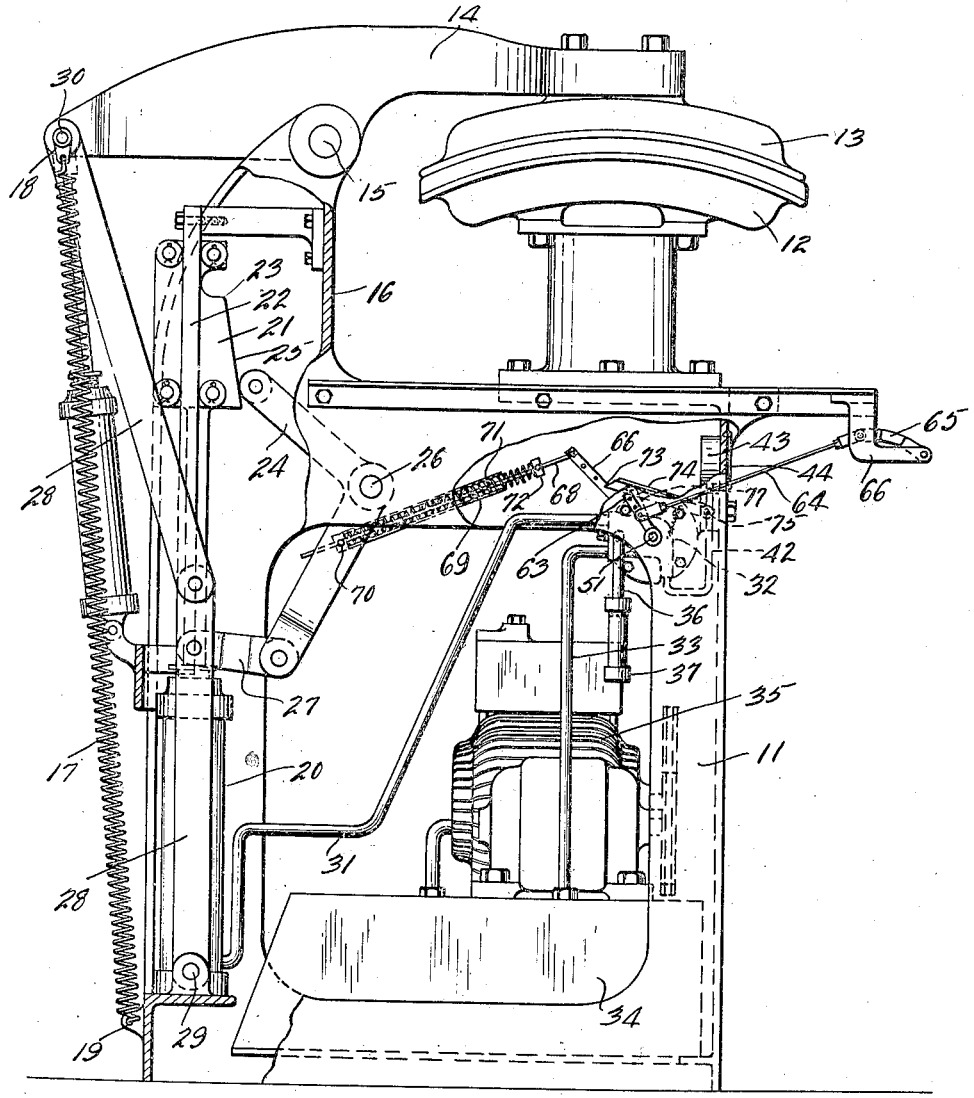
Figure 2 is a similar view showing the press closed with the pressure locked therein.

The press accordingly is arranged for fluid pressure operation, upward movement of actuator 21 first swinging the bell-crank to expand the toggle until the press is nearly closed by riding of the free arm of bell-crank 24 on the shoulder 23 with the actuator and the actuator upon continued upward movement applying the wedge action of its wedge 25 to the bell-crank to create a heavy final pressure on the work in the press. (See Figure 2.)

Fluid under pressure may be supplied to or relieved from cylinder 20 through a conduit 31 connected through a single control valve 32 to a pressure line 33 which may be connected to a self-contained pressure tank 34 and compressor and motor unit 35, and also connected through the valve 32 to a relief line 36 on which may be a muffler 37. Valve 32 is adapted for two-hand control as will be described.

Referring more particularly to Figures 5, 6, and 7, valve 32 includes a fixed disc member 38 and a movable disc member 39 cooperating therewith in face to face relation. Disc 38 provides one end for the housing 32 of the valve and its control mechanism and is provided with a duct 40, to which the pressure line 33 is connected and which is connected with a branch duct 40a terminating in a pressure supply port 41 in the face of disc 38 and connected by conduit 42 with a pressure gage 43 on a panel 44 arranged on the front of the press. Disc 38 is also provided with a duct 45 to which the conduit 31 is connected and which terminates in a port 46 in the face of disc 38 arranged 90° from port 41. Disc 38 is further provided with a duct 47 terminating at the face of disc 38 in a port 48, 90° from port 46 and opposite to or 180° from port 41. Duct 47 is connected to the relief line 36.

The valve disc 39 is provided with arcuate slots 49 and 50 in the face thereof, the former for cooperation with the pressure supply port 41 and port 46 of disc 38 and the latter for cooperation with port 46 and the relief port 48. Disc 39 is journaled to rotate on a rock shaft 51 extending through disc 38 and through a bearing 52 in frame 11 (Figure 3) and is urged in cooperation with disc 38 by a spring 53. Valve disc 39 is connected for rotation with a sleeve 54 journaled in housing 32 and on shaft 51. A second rock shaft 55 is journaled in housing 32 in line with shaft 51 and with one end adjacent to the end of shaft 51, the other end of shaft 55 being journaled in a bearing 56 in frame 11, bearings 52 and 56 being preferably at opposite sides of frame 11.

The adjacent ends of rock shafts 51 and 55 are each provided with bevel gears respectively numbered 57 and 58 keyed thereon and journaled in sleeve 54. Gears 57 and 58 are both meshed with intermediate bevel gears 59 and 60 journaled on radial pins 61 and 62 respectively in sleeve 54.

This provides a differential mechanism for operating valve disc 39 by rock shafts 51 and 55 to rotate the valve disc. It will be apparent that rotation of either of shafts 51 or 55 separately will be ineffective on the sleeve 54 because of the differential action therebetween but if shafts 51 and 55 are simultaneously rotated, sleeve 54 will rotate therewith. The arcuate ducts 49 and 50 in valve disc 39 are designed and arranged so that cooperation thereof with the ports in valve disc 38 to supply fluid under pressure through the valve to cylinder 20 is effected by simultaneous rotation of shafts 51 and 55.

The outer ends of shafts 51 and 55 are each provided with a crank 63 connected by a link 64 to a hand lever 65 pivoted on a bracket 66 at each side adjacent the top of frame 11 at the front of the press.

To interconnect the two-hand control with the press for the purpose specified, an arm 66 is secured to sleeve 54 at 67 and the free end thereof is provided with a rod 68 hingedly connected thereto and slidable through a barrel 69 hinged at 70 on bell-crank 24. Barrel 69 has a compression spring 71 therein acting on a collar 72 secured on rod 68 so as normally to urge the sleeve 54 to a valve closed position in which cylinder 20 is connected to the relief line 36. Arm 66 has a notch 73 therein arranged to be engaged by a dog 74 pivoted at 75 on frame 11 and held in engagement with arm 66 by a tension spring 76. Collar 72 is arranged on rod 68 so as to engage the end of barrel 69 as shown in Figures 1 and 10 just as arcuate duct 49 has moved sufficiently into cooperation with ports 41 and 46 to connect the fluid pressure line with the conduit 31 to deliver fluid under pressure to the cylinder. As shown in Figure 10, the arcuate duct 49 and ports 41 and 46 will not be in full cooperation at this time, and the dog 74 is still not in engagement with notch 73 and accordingly, if either hand were released from the operating handles 65, spring 71 would cause the pressure line to be disconnected and set the valve 32 to relieve pressure from the cylinder 20. Provision is thus made to prevent removal of either hand from handle 65 until the press is substantially closed.

The notch 73 and dog 74 are so arranged that as the barrel 69 moves with the bell-crank 24 until the press is substantially closed, as indicated in dotted lines in Figure 1, and moved away from the collar 72, the follow-up action of the hand pressure on levers 65 will cause the dog 74 to engage in notch 73 and lock the valve 32 open to maintain pressure in cylinder 20. (See Figures 2 and 8.) Then, and only then, may either hand be removed from handles 65 without the press swinging open because of pressure therein being relieved. To release the dog 74, arms 77 and 78 are respectively secured on shafts 51 and 55 to engage the dog by pulling of either of handles 65 upwardly. (See especially Figures 2, 5, and 8.)

In the operation of the press, the work is placed therein. Then both levers 65 are depressed partly opening valve 32 and permitting pressure to build up in cylinder 20 to swing the press shut, complete opening of valve 32 and locking thereof during this neutral stage being prevented by the collar 72 engaging the barrel 69. As barrel 69 moves with bell-crank 24 as the head 13 swings shut it permits further follow-up movement of the pressure of the hands on lever 65 to completely open valve 32 to depress dog 74 into engagement with notch 73. At this time the arcuate duct 49 is fully connecting ports 41 and 46, and the wedge 25 moves in engagement with the free arm of bell-crank 24 imparting a final heavy pressure to the relatively movable press members.

When the press is to be opened, either lever 65 is lifted, an arm 77 or 78 disengaging dog 74 from notch 73 whereupon spring 71 operates valve 32 to its closed position with arcuate duct 50 in valve member 39 in cooperation with port 46 and relief port 48. Pressure in cylinder 20 is thus relieved and springs 17 cause the press to open.

While the invention has been specifically described in connection with a laundry press, it will be understood that it is applicable for two hand safety control of all sorts of apparatus comprising relatively movable members between which an operator may catch his hand. It is also understood that modifications of the two-hand control itself may be resorted to without departing from the spirit of the invention or the scope of the appended claims.

What is claimed is:

1. The combination with a press and means for actuating the same including a fluid pressure cylinder of a single valve for controlling the supply of fluid under pressure to said cylinder to close the press and the relief of pressure fluid from said cylinder to permit the press to open, a two-hand actuating means for said valve comprising separate rock shafts, each adapted to be rocked in one direction by one hand of an operator to operate the press, said shafts being arranged in line and having bevel gears secured on their adjacent ends, a rotatable sleeve about the rock shafts for operating said valve, bevel gearing on said sleeve meshed with both bevel gears on said rock shafts whereby operation of the valve can be effected only by simultaneous operation of said rock shafts in said direction, means normally holding the valve closed, means for latching the valve open, connections between the valve and a part of the press to prevent actuation of said latching means until the press is substantially closed, and means on each rock shaft for engaging and releasing the latch by rotation of the rock shaft in the opposite direction.

2. The combination with a press and means for actuating the same including a fluid pressure cylinder of a single valve for controlling the supply of fluid under pressure to said cylinder to close the press and the relief of pressure fluid from said cylinder to permit the press to open, a two-hand actuating means for said valve comprising separate rock shafts, each adapted to be rocked in one direction by one hand of an operator to operate the press, said shafts being arranged in line and having bevel gears secured on their adjacent ends, a rotatable sleeve about the rock shafts for operating said valve, bevel gearing on said sleeve meshed with both bevel gears on said rock shafts whereby operation of the valve can be effected only by simultaneous operation of said rock shafts in said direction, means normally holding the valve closed, means for latching the valve open, connections between the valve and a part of the press to prevent actuation of said latching means until the press is substantially closed, and means on a rock shaft for engaging and releasing the latch by operation thereof in the opposite direction.

3. The combination with a press and means for actuating the same including a fluid pressure cylinder of a single valve for controlling the supply of fluid under pressure to said cylinder to close the press and the relief of pressure fluid from said cylinder to permit the press to open, a two-hand actuating means for said valve comprising separate rock shafts, each adapted to be rocked in one direction by one hand of an operator to operate the press, said shafts being arranged in line and having bevel gears secured on their adjacent ends, a rotatable sleeve about the rock shafts for operating said valve, bevel gearing on said sleeve meshed with both bevel gears on said rock shafts whereby operation of the valve can be effected only by simultaneous operation of said rock shafts in said direction, means normally holding the valve closed, means for latching the valve open, connections between the valve and a part of the press to prevent actuation of said latching means until the press is substantially closed, and means for engaging and releasing said latch.

4. The combination with a press and means for actuating the same including a fluid pressure cylinder of a single valve for controlling the supply of fluid under pressure to said cylinder to close the press and the relief of pressure fluid from said cylinder to permit the press to open, a two-hand actuating means for said valve comprising separate rock shafts, each adapted to be rocked in one direction by one hand of an operator to operate the press, said shafts being arranged in line and having bevel gears secured on their adjacent ends, a rotatable sleeve about the rock shafts for operating said valve, bevel gearing on said sleeve meshed with both bevel gears on said rock shafts whereby operation of the valve can be effected only by simultaneous operation of said rock shafts in said direction, means normally holding the valve closed, means for latching the valve open, connections between the valve and a part of the press to prevent actuation of said latching means until the press is substantially closed.

5. The combination with a press and means for actuating the same including a fluid pressure cylinder of a single valve for controlling the supply of fluid under pressure to said cylinder to close the press and the relief of pressure fluid from said cylinder to permit the press to open, a two-hand actuating means for said valve comprising separate rock shafts, each adapted to be rocked in one direction by one hand of an operator to operate the press, said shafts being arranged in line and having bevel gears secured on their adjacent ends, a rotatable sleeve about the rock shafts for operating said valve, bevel gearing on said sleeve meshed with both bevel gears on said rock shafts whereby operation of the valve can be effected only by simultaneous operation of said rock shafts in said direction, means for locking the valve open, and means on each rock shaft for engaging and releasing the lock by rotation of the rock shaft in the opposite direction.

6. The combination with a press and means for actuating the same including a fluid pressure cylinder of a single valve for controlling the supply of fluid under pressure to said cylinder to close the press and the relief of pressure fluid from said cylinder to permit the press to open, a two-hand actuating means for said valve comprising separate rock shafts, each adapted to be rocked in one direction by one hand of an operator to operate the press, said shafts being arranged in line and having bevel gears secured on their adjacent ends, a rotatable sleeve about the rock shafts for operating said valve, bevel gearing on said sleeve meshed with both bevel gears on said rock shafts whereby operation of the valve can be effected only by simultaneous operation of said rock shafts in said direction, means for locking the valve open, and means on a rock shaft for engaging and releasing the lock by operation thereof in the opposite direction.

7. The combination with a press and means for actuating the same including a fluid pressure cylinder of a single valve for controlling the supply of fluid under pressure to said cylinder to close the press and the relief of pressure fluid from said cylinder to permit the press to open, a two-hand actuating means for said valve comprising separate rock shafts, each adapted to be rocked in one direction by one hand of an operator to operate the press, said shafts being arranged in line and having bevel gears secured on their adjacent ends, a rotatable sleeve about the rock shafts for operating said valve, bevel gearing on said sleeve meshed with both bevel gears on said rock shafts whereby operation of the valve can be effected only by simultaneous operation of said rock shafts in said direction, and means for locking the valve in operated position and for releasing said valve from locked position.

8. The combination with a press and means for actuating the same including a fluid pressure cylinder of a single valve for controlling the supply of fluid under pressure to said cylinder to close the press and the relief of pressure fluid from said cylinder to permit the press to open, a two-hand actuating means for said valve comprising separate rock shafts, each adapted to be rocked in one direction by one hand of an operator to operate the press, said shafts being arranged in line and having bevel gears secured on their adjacent ends, a rotatable sleeve about the rock shafts for operating said valve, bevel gearing on said sleeve meshed with both bevel gears on said rock shafts whereby operation of the valve can be effected only by simultaneous operation of said rock shafts in said direction.

9. The combination with a press and means for actuating the same including a prime mover of a single device for controlling the prime mover to close the press, a two-hand actuating means for said device comprising separate rock shafts, each adapted to be rocked in one direction by one hand of an operator to operate the press, said shafts being arranged in line and having bevel gears secured on their adjacent ends, a rotatable sleeve about the rock shafts for operating said device, bevel gearing on said sleeve meshed with both bevel gears on said rock shafts whereby operation of the device can be effected only by simultaneous operation of said rock shafts in said direction, an arm on said sleeve, a rod connected to said arm, a barrel connected to a part of the press to move therewith as the press is closed, a collar on the rod, a spring in the barrel acting on the collar tending to maintain the device in an open press position, said collar being adapted to engage said barrel to limit the actuation of the device until the press is substantially closed, and means engaging said arm and adapted to latch the device to closed press position by said arm, said latch means normally held out of latching engagement by said barrel until the barrel has moved with said press part to the position said part assumes when the press is substantially closed which permits movement of the device to a position in which the latch may operate.

10. The combination with a press and means for actuating the same including a prime mover of a single device for controlling the prime mover to close the press, a two-hand actuating means for said device comprising separate rock shafts, each adapted to be rocked in one direction by one hand of an operator to operate the press, said shafts being arranged in line and having bevel gears secured on their adjacent ends, a rotatable sleeve about the rock shafts for operating said device, bevel gearing on said sleeve meshed with both bevel gears on said rock shafts whereby operation of the device can be effected only by simultaneous operation of said rock shafts in said direction, means normally holding the valve closed, means for latching the valve open, connections between the valve and a part of the press to prevent actuation of said latching means until the press is substantially closed and means on each rock shaft for engaging and releasing the latch by rotation of the rock shaft in the opposite direction.

11. The combination with a press including relatively movable press members normally urged apart, a prime mover, mechanism operable by the prime mover for urging the press members together and a device for controlling operation of the prime mover, said device normally being urged to a position in which the press will open or remain open; of means for actuating said control device including two hand-operated elements, operating means between said elements and said control device and operable only by actuation of both of said elements, a latch for holding the control device in a position whereby the prime mover will close the press, and means controlled by movement of a part of the press operating mechanism to prevent engagement of the latch until the press is substantially closed whereby the press will open should either hand-operated element be released prior to engagement of the latch.

12. The combination with a press including relatively movable press members normally urged apart, a prime mover, mechanism operable by the prime mover for urging the press members together and a device for controlling operation of the prime mover, said device normally being urged to a position in which the press will open or remain open; of means for actuating said control device including two hand-operated elements, operating means between said elements and said control device and operable only by actuation of both of said elements, a latch for holding the control device in a position whereby the prime mover will close the press, means controlled by movement of a part of the press operating mechanism to prevent engagement of the latch until the press is substantially closed whereby the press will open should either hand-operated element be released prior to engagement of the latch, and means operable by a hand-operated element for disengaging the latch to permit the press to open.

13. The combination with a press including relatively movable press members normally urged apart, fluid pressure means for operating the press, mechanism operable by the fluid pressure means for urging the press members together and a valve for controlling operation of the fluid pressure means, said valve normally being urged to a closed position in which pressure is relieved from said fluid pressure means; of means for actuating said valve including two hand-operated elements, operating means between said elements and said valve and operable only by actuation of both of said elements, lock means for holding the valve open, and means controlled by movement of a part of the press operating mechanism to prevent operation of the lock means until the press is substantially closed whereby the press will open should either hand-operated element be released prior to operation of the lock means.

14. The combination with a press including relatively movable press members normally urged apart, fluid pressure means for operating the press, mechanism operable by the fluid pressure means for urging the press members together and a valve for controlling operation of the fluid pressure means, said valve normally being urged to a closed position in which pressure is relieved from said fluid pressure means; of means for actuating said valve including two hand-operated elements, operating means between said elements and said valve and operable only by actuation of both of said elements, a lock means for holding the valve open, means controlled by movement of a part of the press operating mechanism to prevent operation of the lock means until the press is substantially closed whereby the press will open should either hand-operated element be released prior to operation of the lock means, and means operable by a hand-operated element for releasing the lock means to permit the press to open.

15. The combination comprising relatively movable press members normally urged apart, power means for relatively moving the press members, and operating mechanism between the power means and the press members; of a two-hand operated device for controlling the power means, said device including a part normally urged to a position in which the press will open or remain open, means for latching said part to hold the press closed, and means controlled by a part of the press mechanism to prevent engagement of said latch upon operation of the two-hand control device to close the press until the press is substantially closed whereby if either hand is released from the two-hand operated device prior to engagement of the latch the press will open.

16. In a garment or laundry pressing machine in combination cooperative pressing jaws and power operating mechanism therefor including a motor; means to control the supply of working fluid to the motor; a single member to actuate the working fluid supply control means; a pair of operator operated control manuals for operating the single member through differential gearing so that operation of both of said manuals is necessary to cause operation of the single member and the working fluid supply control means actuated thereby; and means, operable when the pressing jaws come into substantially closed position, for locking the single member in operated position.

17. In a garment or laundry pressing machine in combination cooperative pressing jaws and power operating mechanism therefor including a motor; a single valve for controlling the supply of working fluid to the motor; a two-hand control means for said valve, including a separate rock member for operation by each hand of the operator, and differential mechanism associated with said rock members; means actuated by said differential mechanism when both of said rock members are operated to open the valve for supplying working fluid to the motor; and a latch, operable when the pressing jaws come into substantially closed position, to engage the means actuated by the differential mechanism and hold the same in operated position.

18. In a garment or laundry pressing machine in combination cooperative pressing jaws and power operating mechanism therefor including a motor; a single valve for controlling the supply of working fluid to the motor; a two-hand control means for said valve, including a separate rock member for operation by each hand of the operator, and differential mechanism associated with said rock members; means actuated by said differential mechanism when both of said rock members are operated to open the valve for supplying working fluid to the motor; and means mechanically connected with the power operating mechanism and operated thereby when the pressing jaws reach substantially pressing position, for holding the valve in operated position to lock the press closed.

JOHN ZIMARIK.